US012619528B2

(12) United States Patent
Muthiah et al.

(10) Patent No.: US 12,619,528 B2
(45) Date of Patent: May 5, 2026

(54) DATA STORAGE DEVICE AND METHOD FOR CONFIGURING A MEMORY TO WRITE A REQUESTED AMOUNT OF DATA OVER THE MEMORY'S LIFETIME

(71) Applicant: Sandisk Technologies, Inc., Milpitas, CA (US)

(72) Inventors: Ramanathan Muthiah, Bangalore (IN); Narendhiran Chinnaanangur Ravimohan, Bangalore (IN); Ramkumar Ramamurthy, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/416,329

(22) Filed: Jan. 18, 2024

(65) Prior Publication Data

US 2025/0238361 A1    Jul. 24, 2025

(51) Int. Cl.
*G06F 12/02* (2006.01)

(52) U.S. Cl.
CPC ................................ *G06F 12/0246* (2013.01)

(58) Field of Classification Search
CPC ......... G06F 12/0246; G06F 2212/1036; G06F 2212/1044; G06F 2212/7204; G06F 2212/7206; G06F 2212/7208; G11C 11/56; G11C 16/349
See application file for complete search history.

(56) References Cited

U.S. PATENT DOCUMENTS

| | | | |
|---|---|---|---|
| 9,135,190 | B1 | 9/2015 | Bruce et al. |
| 9,977,628 | B2 | 5/2018 | Kochar et al. |
| 10,908,844 | B2 | 2/2021 | Muthiah |
| 11,379,031 | B2 | 7/2022 | Navon et al. |
| 2006/0282610 | A1 | 12/2006 | Dariel et al. |
| 2009/0276570 | A1 | 11/2009 | Cheng et al. |
| 2013/0138870 | A1 | 5/2013 | Yoon et al. |
| 2018/0293003 | A1* | 10/2018 | Muchherla ............. G11C 16/10 |
| 2019/0377681 | A1* | 12/2019 | Hodes ................. G06F 12/0848 |
| 2020/0401332 | A1* | 12/2020 | Ravimohan ........... G06F 3/0604 |

(Continued)

OTHER PUBLICATIONS

U.S. Appl. No. 18/448,887, filed Aug. 11, 2023 entitled "Selectable Performance Boost for Storage Devices."

(Continued)

*Primary Examiner* — Nanci N Wong
(74) *Attorney, Agent, or Firm* — Crowell & Moring LLP

(57) ABSTRACT

A data storage device is provided comprising a memory and one or more processors. The memory comprises a plurality of blocks, wherein each block is configurable as a single-level cell (SLC) block or as a multi-level cell (MLC) block. The one or more processors, individually or in combination, are configured to: receive a request from a host, wherein the request indicates a total amount of data to be written in the memory during a lifetime of the memory; determine a first number of blocks of the plurality of blocks to configure as SLC blocks and a second number of blocks of the plurality of blocks to configure as MLC blocks in order to attempt to satisfy the request; configure the first number of blocks as SLC blocks; and configure the second number of blocks as MLC blocks. Other embodiments are provided.

20 Claims, 6 Drawing Sheets

(56) References Cited

U.S. PATENT DOCUMENTS

| | | | |
|---|---|---|---|
| 2020/0401514 A1* | 12/2020 | Liang .................. | G06F 12/0253 |
| 2021/0073119 A1* | 3/2021 | Amaki .................. | G06F 3/0613 |
| 2021/0141553 A1* | 5/2021 | Yoo ...................... | G06F 3/0679 |
| 2021/0342263 A1 | 11/2021 | He et al. | |
| 2023/0205459 A1* | 6/2023 | Huang ............... | G11C 11/5621 |
| | | | 711/154 |
| 2023/0251914 A1* | 8/2023 | Chamberlin ........ | G06F 9/44505 |
| | | | 718/104 |
| 2023/0384975 A1 | 11/2023 | Bordia et al. | |
| 2024/0201892 A1* | 6/2024 | Wu ...................... | G06F 3/0679 |
| 2025/0013368 A1* | 1/2025 | Hubbard .............. | G06F 3/0679 |

OTHER PUBLICATIONS

International Search Report mailed May 8, 2025 for International Application No. PCT/US2025/010805.
Written Opinion mailed May 8, 2025 for International Application No. PCT/US2025/010805.
Search Strategy completed May 8, 2025 for International Application No. PCT/US2025/010805.

* cited by examiner

DATA STORAGE DEVICE AND METHOD FOR CONFIGURING A MEMORY TO WRITE A REQUESTED AMOUNT OF DATA OVER THE MEMORY'S LIFETIME

BACKGROUND

A data storage device can be used to store data in its memory. The memory of some data storage devices can be configured to include single-level cell (SLC) blocks and/or multi-level cell (MLC) blocks, which have different performance characteristics.

DETAILED DESCRIPTION

Figures 1A, 1B, 1C:
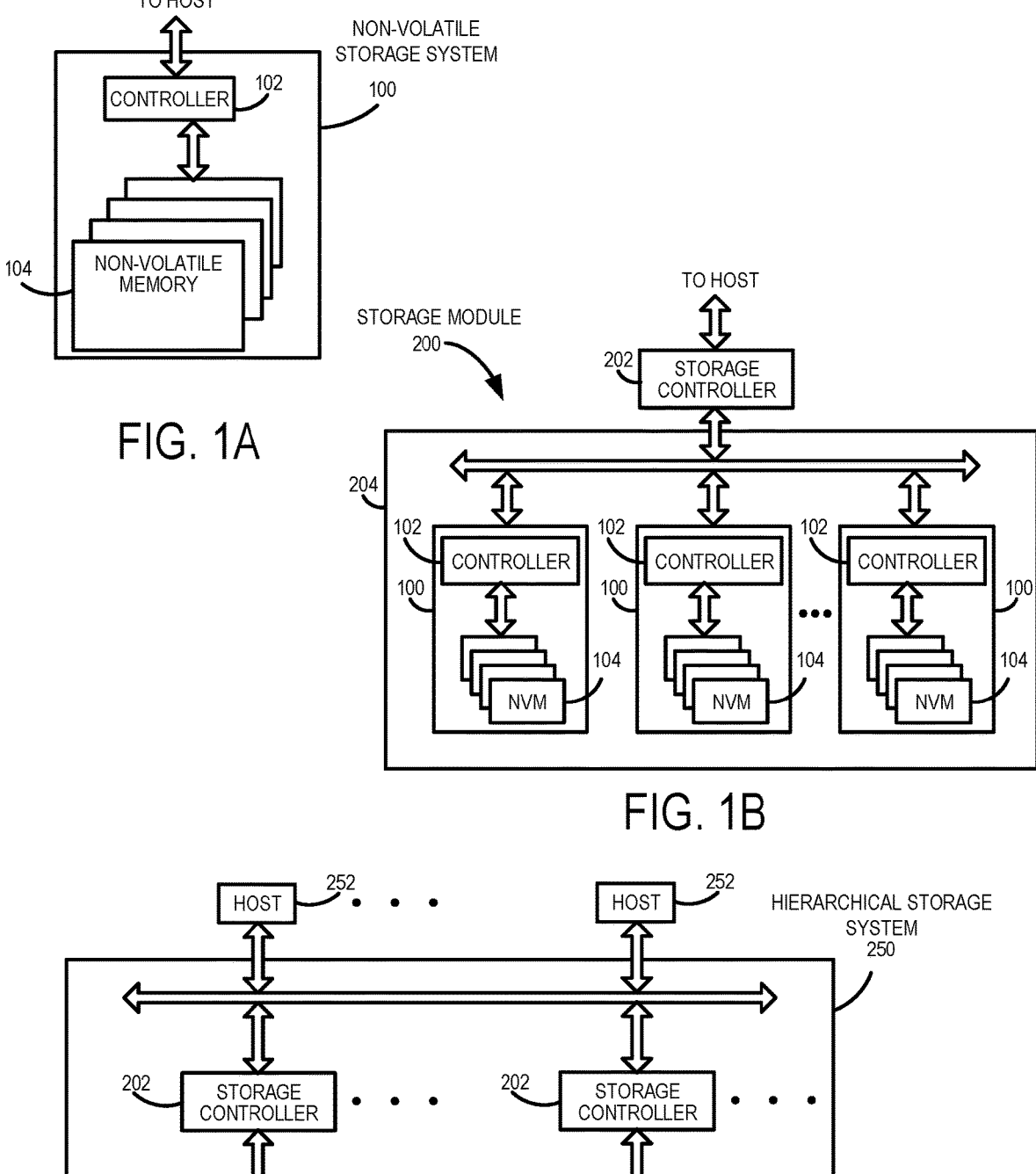
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for configuring a memory to write a requested amount of data over the memory's lifetime. In one embodiment, a data storage device is provided comprising a memory and one or more processors. The memory comprises a plurality of blocks, wherein each block is configurable as a single-level cell (SLC) block or as a multi-level cell (MLC) block. The one or more processors, individually or in combination, are configured to: receive a request from a host, wherein the request indicates a total amount of data to be written in the memory during a lifetime of the memory; determine a first number of blocks of the plurality of blocks to configure as SLC blocks and a second number of blocks of the plurality of blocks to configure as MLC blocks in order to attempt to satisfy the request; configure the first number of blocks as SLC blocks; and configure the second number of blocks as MLC blocks.

In some embodiments, the one or more processors, individually or in combination, are further configured to: determine a memory capacity resulting from the first number of blocks being configured as SLC blocks and the second number of blocks being configured as MLC blocks; and inform the host of the determined memory capacity.

In some embodiments, the first number of blocks are configured as SLC blocks and the second number of blocks are configured as MLC blocks in response to receiving approval from the host of the determined memory capacity.

In some embodiments, the one or more processors, individually or in combination, are further configured to: receive a file system update request from the host; and in response to receiving a file system update request from the host, designate the data storage device as having the determining memory capacity.

In some embodiments, the first and second numbers are determined using a data structure that associates a plurality of total amounts of data to be written in the memory during the lifetime of the memory with a plurality of capacities of the memory.

In some embodiments, the one or more processors, individually or in combination, are further configured to: dynamically populate the data structure based on SLC block size, MLC block size, SLC block endurance, and MLC block endurance.

In some embodiments, the request from the host comprises a selection of one of a plurality of options.

In some embodiments, the plurality of options is provided to the host by the data storage device via a vendor command.

In some embodiments, the one or more processors, individually or in combination, are further configured to use block health metrics in determining the first and second numbers.

In some embodiments, the total amount of data is directly expressed in the request from the host.

In some embodiments, the total amount of data is indirectly expressed in the request from the host.

In some embodiments, the total amount of data is indirectly expressed using a configuration scale.

In some embodiments, the memory comprises a three-dimensional memory.

In another embodiment, a method is provided that is performed in a data storage device comprising a memory comprising a plurality of memory areas, each memory area being configurable as a single-level cell (SLC) memory area or as a multi-level cell (MLC) memory area. The method comprises: receiving, from a host, an indication of an amount of data to be stored in the memory over a plurality of write cycles; determining an SLC-MLC configuration of the memory to attempt to store the indicated amount of data in the memory over the plurality of write cycles; and configuring the memory according to the determined SLC-MLC configuration.

In some embodiments, the SLC-MLC configuration is determined using a data structure that associates a plurality of amounts of data with a plurality of capacities of the memory.

In some embodiments, the method further comprises dynamically populating the data structure based on SLC memory area size, MLC memory area size, SLC memory area endurance, and MLC memory area endurance.

In some embodiments, the method further comprises: determining a memory capacity resulting from the determined SLC-MLC configuration; and informing the host of the determined memory capacity.

In some embodiments, the memory is configured according to the determined SLC-MLC configuration in response to receiving approval from the host of the determined memory capacity.

In some embodiments, the method further comprises: receiving a file system update request from the host; and in response to receiving a file system update request from the host, designating the data storage device as having the determining memory capacity.

In some embodiments, the indication is expressed using a configuration scale.

In another embodiment, a data storage device is provides comprising: a memory; and means for dynamically negotiating, with a host, a configuration of the memory that trades-off total amount of data to be written in the memory during the memory's life with capacity of the memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
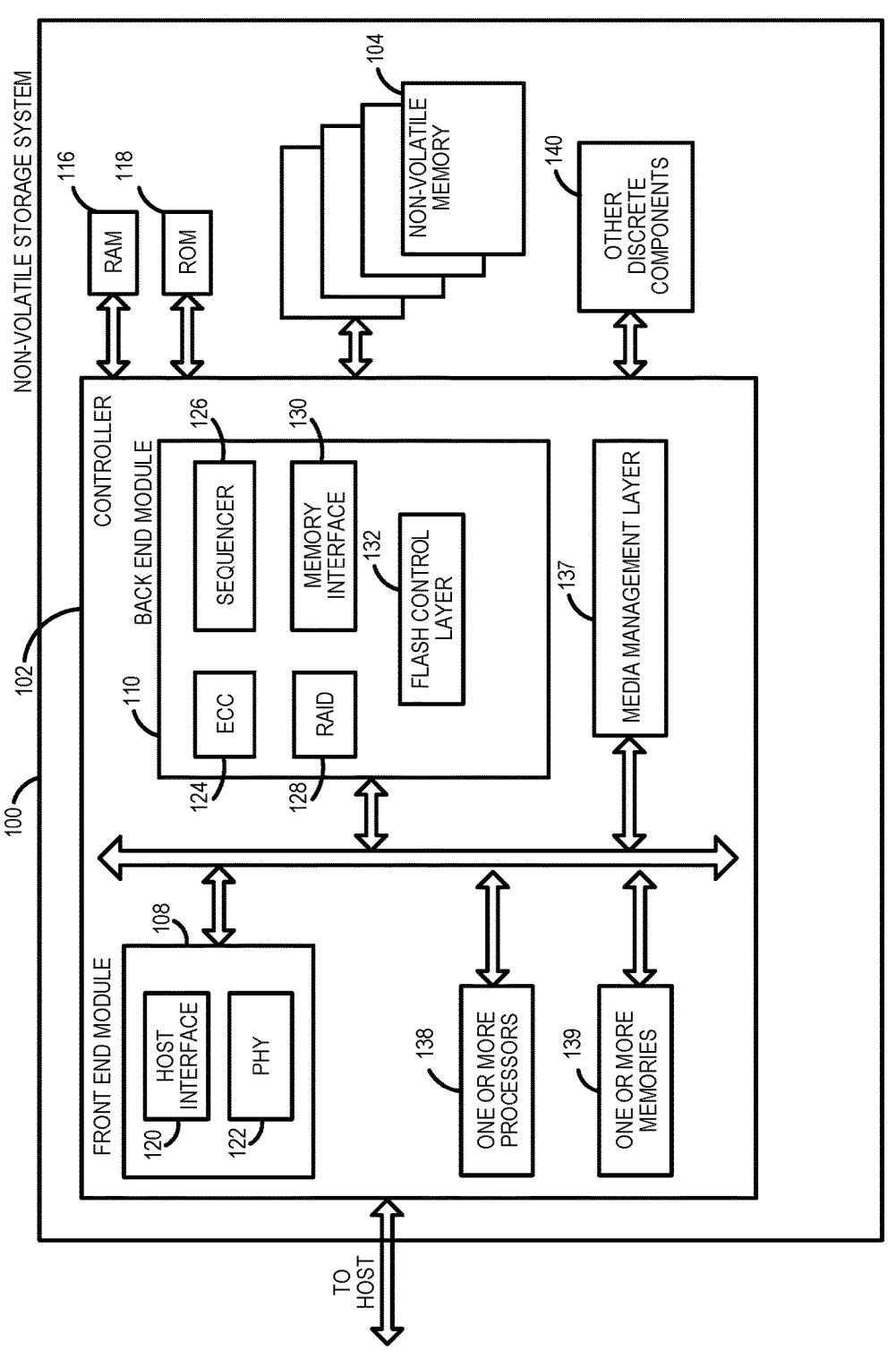
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
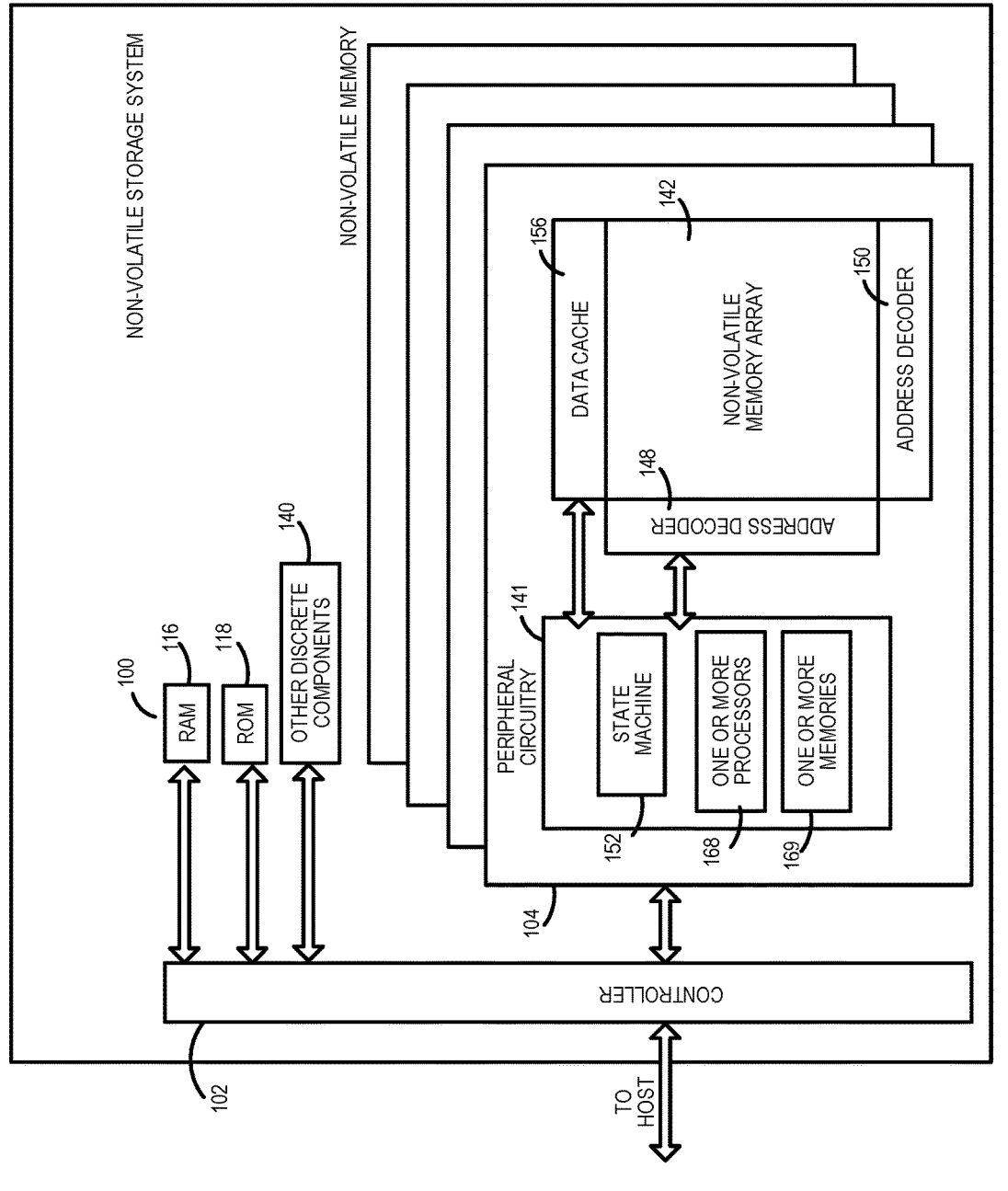
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data.

The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning R again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
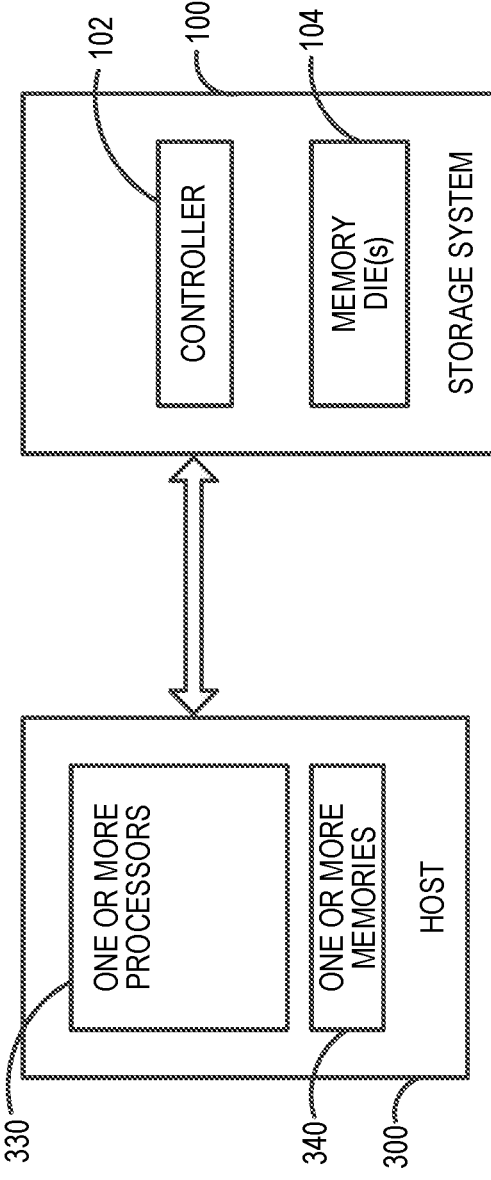
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The memory 104 can be characterized by a total amount of data that can be written to the memory 104 in its lifetime. For example, the memory 104 can be characterized by terabytes written (TBW), which is the total amount of terabytes of data that can be written in the memory 104 is its lifetime. (While TBW is used in some of the examples presented herein, it should be understood that any unit can be used.) In some applications, such as surveillance, TBW can be considered an indication of how much time the data storage device 100 can survive before being replaced. Hence, TBW can be an important cost parameter for original equipment manufacturer (OEM) customers. This can be a different perspective from how a retail customer looks at memory, as the retail customer may look at memory simply in terms of capacity and marketed performance numbers. So, in some situations, TBW can be considered more of an OEM parameter.

The memory 104 can have certain characteristic features based on which the write cycles are decided. In one example, SLC block endurance is in the range of 100K cycles (i.e., the SLC block can be written and erased 100K times), and MLC block endurance is in the range of many hundreds of cycles (e.g., 1K cycles). These cycles can be determined based on the bit error rate (BER) in each case so that guaranteed cycles can be met. These parameters can change based on the actual quality of memory.

In this example, the SLC and TLC endurances are 100K and 1K cycles, respectively. Also in this example, assume there are ten blocks in the memory, such that each block size is 100 MB if used as SLC; hence, the same block size is 300 MB if used as TLC. For the sake of clarity, other memory blocks and over-provisioned blocks are not accounted for in this example. If all the ten blocks are used as TLC, then the block cycling is 1K TLC cycles. Since the total possible capacity is 300 MB*10 blocks=3 GB per device cycle, TBW=3 GB*1K=3 TB. This will be referred to as "State A."

If all ten blocks are used as SLC, then the block cycling is 100K SLC cycles. Since the total possible capacity is 100 MB*10 blocks=1 GB per device cycle, TBW=1 GB*100K=100 TB. This is a 33-times-higher TBW than the TLC design, but the capacity is just three times lower. This will be referred to as "State B."

The usual belief is that the SLC design is more expensive than the TLC design. However, as shown by the above examples, the SLC design becomes more cost efficient than the TLC design if the application's priority is TBW. Surveillance storage is one application where the OEM customer's priority may be to extend the TBW simply to extend the lifetime of the memory for cost savings. Other applications, such as set-top box (STB) streaming recordings, may also have a TBW priority.

The following embodiments can be used to enable TBW configurable solutions to enhance value by using tradeoff parameters. In one embodiment, the controller 102 of the data storage device 100 can dynamically negotiate a suitable TBW with the host 300, determine the number of blocks to be used for TBW purposes, and trade off capacity for a given number of blocks. The controller 102 (e.g., the FTL in the controller 102) can manage a TBW-capacity data structure (e.g., a table), receive a TBW request from the host 300, determine, from the data structure, which blocks to be use as SLC to meet a particular TBW, and use the rest of the blocks as TLC for capacity.

In another embodiment, the controller 102 can dynamically evaluate the possible TBW/capacity configuration for a requested TBW and share with it with the host 300 (e.g., for approval). Also, the controller 102 can dynamically populate the TBW-capacity data structure for various TBW/capacities by accounting for block cycles obtained through a configuration table, as shown mathematically above. For example, using all blocks as TLC can make the memory 104 capacity-centric as shown as State A. On the other side of spectrum, using all the blocks as SLC can make the memory 104 TBW-centric with capacity being achieved purely from SLC blocks as shown in State B (here, TBW is fixed as per host request, and the capacity is the byproduct).

The controller 102 can evaluate the set of available blocks and the received TBW and determine the number of SLC blocks to accommodate a TBW, with the rest of the blocks configured for TLC. The controller 102 can determine the total capacity from both set of blocks and indicate the capacity commitment to the host 300 corresponding to the TBW. The host 200 can, thereafter, makes file system (FS) adjustments to tag the capacity with the data storage device 100/memory 104. From this point, the data storage device 100 can behave like a typical data storage device 100 with the committed capacity and the TBW.

Figure 4:
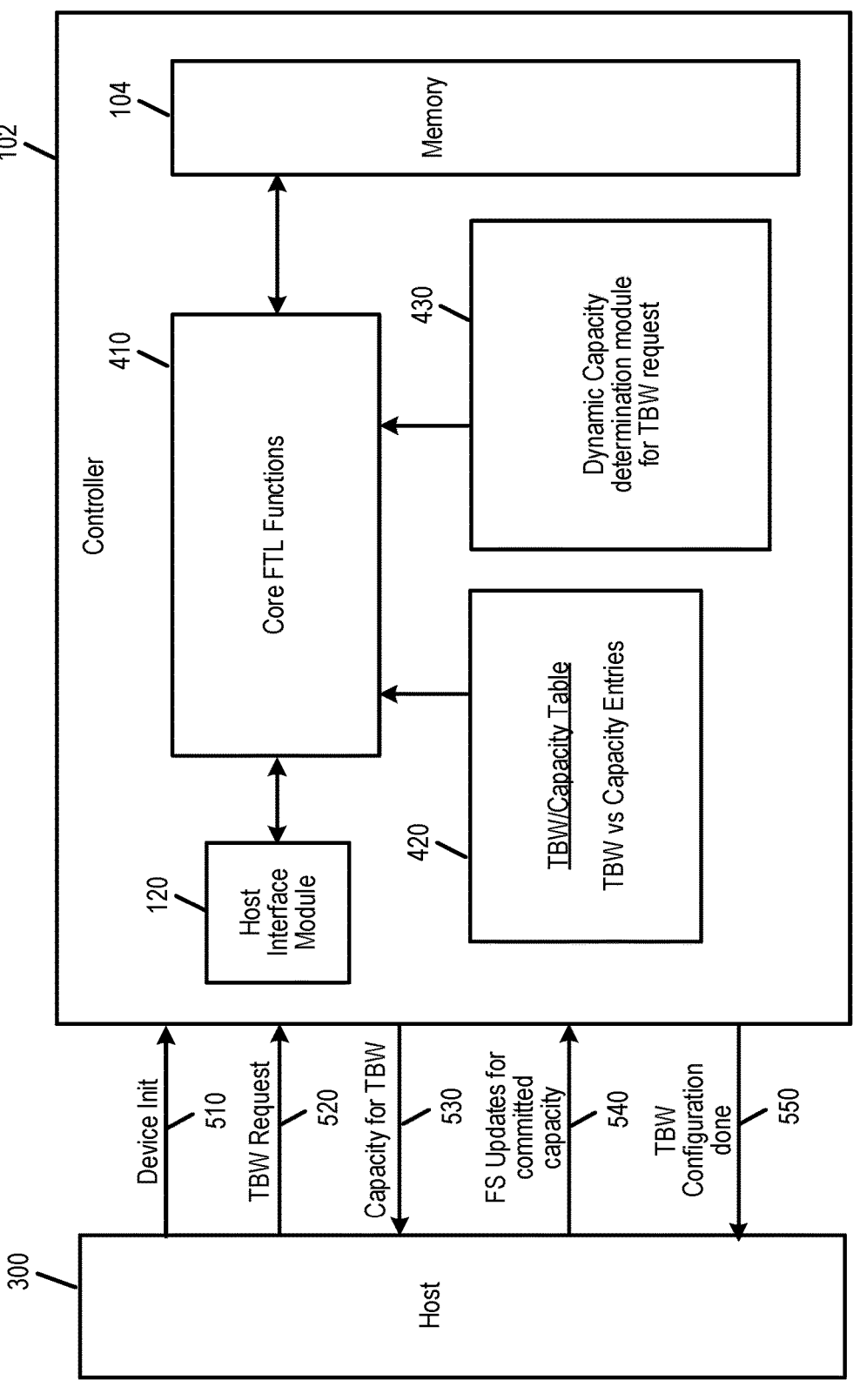
FIG. 4 is a block diagram of a host and a data storage device controller of an embodiment.

Turning again to the drawings, FIG. 4 is a block diagram of the data storage device controller 102 and the host 300 of an embodiment. As shown in FIG. 4, in this embodiment, the data storage device controller 102 comprises a host interface module 120, a module 410 with core FTL functions 410, a memory 104, a TBW/capacity table 420 (data structures other than a table can be used) with TBW vs. capacity entries, and a dynamic-capacity-determination module 430 for TBW requests.

In operation, the controller 102 receive a device initialization command (510) from the host 300, followed by a request indicating a total amount of data to be written in the memory 104 during a lifetime (e.g., a remaining lifetime) of the memory 104 (in this example, indicated as a TBW request). In response, the controller 102 (e.g., using one or more processors (not shown) individually or in combination) determines which of the blocks in the memory 104 to configure as SLC vs. MLC to attempt to satisfy the request (the determined configured may not result in the exact amount requested by the host 300). This can be done using the TBW/capacity table 420 and the dynamic-capacity-determination module 430 for TBW requests. The controller 102 can configure a first number of blocks in the memory 104 as SLC blocks and configure a second number of blocks in the memory 104 as MLC blocks (if the blocks default as SLC or MLC, "configure" can mean keeping the block in its default state rather than taking an action). Additionally, the storage controller 102 can use block health metrics to determine which of the physical blocks can be used in SLC mode and which of them in TLC mode with respect to the configuration that satisfies the host TBW request.

The controller 102 can then determine a memory capacity resulting from the SLC-MLC configuration and inform the host 300 of the determined memory capacity (530). In some embodiments, the controller 102 makes the SLC-MLC configuration only after receiving approval from the host 300 of the determined memory capacity. Also, the controller 102 can receive a file system (FS) update request from the host 300 (540), in response to which the controller 102 can designate the data storage device 100 as having the determining memory capacity. The controller 102 can then inform the host 300 that the TBW configuration is done (560).

Figure 5:
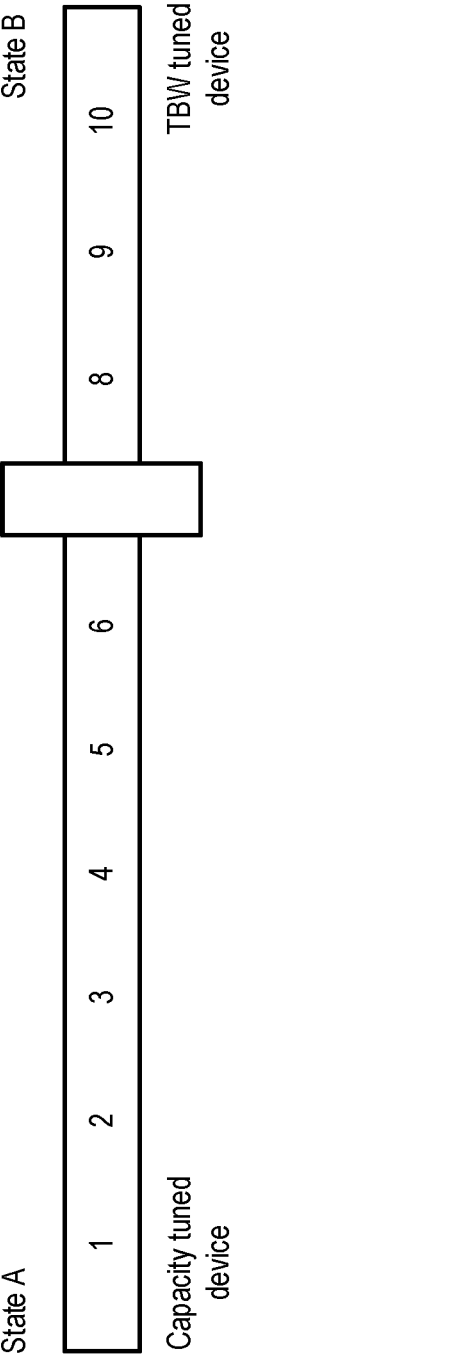
FIG. 5 is an illustration of a configuration scale of an embodiment.

In some embodiments, the data storage device 100 sends the host 300 a set of absolute TBW/capacity configurations via vendor commands (or similar commands) (or the host can request the amount/configuration). Alternatively, as shown in FIG. 5, a configuration scale (e.g., of 1 to 10) can be used to indirectly communicate the request, where 1 refers to a solution in which the FTL module 410 configures all the blocks as TLC capacity (e.g., State A). On the other side of spectrum, 10 refers to State B, which comprises an SLC solution. Other values (e.g., 5 or 6) can refer to a solution providing TBW and capacity ranges in between States A and B. Using the above system of 10 blocks, the device 100, as an example, may go with six blocks for TBW and the remaining four blocks for capacity purposes.

The FTL module 410 can do the math dynamically in line with States A and B on receiving a TBW request as follows. In the same ten-block example, if the TBW is 60 TB as requested by host 300, the FTL module 410 can convert six blocks to SLC for host writes (100 MB size*6 blocks*100K Endurance)=60 TB (from SLC blocks), and further convert four blocks to TLC=300 MB size*4 blocks*1K Endurance=1.2 TB (from TLC blocks), thereby making the total TBW to 61.2 TB and the capacity point to 100 MB*6+300 MB*4=1.8 GB. The FTL module 410 can provide feedback to the host 300 on the 61.2 TB TBW and the 1.8 GB capacity for this configuration request. In some cases, this can further be tuned with multiple iterations to suit a finer number. In such case, steps 520, 530 and 540 shown in FIG. 4 can repeat. An OEM vendor may go with more devices (or more memory chips) for the loss of capacity through this method (e.g., at a maximum of three times), but the TBW gains can far exceed the price the OEM vendor would pay for more devices or more memory in the same device (e.g., 11 times as shown in State A and B).

It should be noted that some prior data storage devices can trade off some portion of capacity, either temporarily or permanently, to achieve better performance. For example, the host may set up burst mode, and the data storage device may respond to it by allocating some of the capacity blocks as SLC cache and take-in host data in a burst mode. These blocks are sometimes referred to as hybrid blocks, and the mechanism is sometimes referred to as hybrid writes since the blocks are used as SLC temporarily and then converted to TLC. However, the embodiments described herein are not this hybrid solution that uses TLC blocks as SLC blocks to achieve the performance trading off with capacity, as well as temporary tradeoff for burst. Rather, the embodiments described herein deal with the TBW dynamic configuration, which was not part of the hybrid solution. That is, while some prior data storage devices may use a capacity/performance tradeoff, such prior data storage devices do not use the TBW concept to help users save cost in the long run.

Other prior data storage devices can have other tradeoffs, such as power and endurance. For example, a host can inform a data storage device on endurance, and the data storage device can modify its power and trim parameters, such as latency and maximum power. This is different from the embodiments presented herein in which a host can provide an indication of TBW, and the data storage device can modify memory capacity in an attempt to provide the requested TBW. Further, TBW and endurance are not "apple to apple" parameters. Device endurance can refer to a non-conventional characteristic of data storage devices that describes an ability of the data storage device to remain active for a long period of time. In short, it is the ability to hold data safely once the data is written. In contrast, TBW can be a measure of the actual data that can be written to the data storage device during its lifetime. So, device endurance may be considered a broader concept that considers the number of program/erase cycles that the data storage device's memory cells can handle. Also, with these embodiments, a capacity tradeoff mechanism can be used to enable a host to choose an appropriate TBW, where capacity is deduced once TBW is decided for the same quality-of-service (QOS), endurance, protection and other non-impacted parameters.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory comprising a plurality of blocks, wherein each block is configurable as a single-level cell (SLC) block or as a multi-level cell (MLC) block, wherein a total amount of data that can be written in the memory during a lifetime of the memory is based on a capacity of each of the plurality of blocks and a number of program/erase cycles that each of the plurality of blocks can endure, and wherein an MLC block comprises a higher capacity but can endure fewer program/erase cycles as compared to an SLC block; and one or more processors, individually or in combination, configured to:

receive a request from a host, wherein the request indicates a requested total amount of data to be written in the memory during the lifetime of the memory, wherein the requested total amount of data to be written in the memory during the lifetime of the memory is different from the number of program/erase cycles that each of the plurality of blocks can endure;

determine a first number of blocks of the plurality of blocks to configure as SLC blocks and a second number of blocks of the plurality of blocks to configure as MLC blocks in order to attempt to satisfy the request, wherein increasing the first number of blocks increases the total amount of data that can be written in the memory during the lifetime of the memory but decreases a total capacity of the memory;

configure the first number of blocks as SLC blocks; and
configure the second number of blocks as MLC blocks.

2. The data storage device of claim 1, wherein the one or more processors, individually or in combination, are further configured to:

determine a memory capacity resulting from the first number of blocks being configured as SLC blocks and the second number of blocks being configured as MLC blocks; and inform the host of the determined memory capacity.

3. The data storage device of claim 2, wherein the first number of blocks are configured as SLC blocks and the second number of blocks are configured as MLC blocks in response to receiving approval from the host of the determined memory capacity.

4. The data storage device of claim 2, wherein the one or more processors, individually or in combination, are further configured to:

receive a file system update request from the host; and in response to receiving a file system update request from the host, designate the data storage device as having the determining memory capacity.

5. The data storage device of claim 1, wherein the first and second numbers are determined using a data structure that associates a plurality of total amounts of data to be written in the memory during the lifetime of the memory with a plurality of capacities of the memory.

6. The data storage device of claim 5, wherein the one or more processors, individually or in combination, are further configured to:

dynamically populate the data structure based on SLC block size, MLC block size, SLC block endurance, and MLC block endurance.

7. The data storage device of claim 1, wherein the request from the host comprises a selection of one of a plurality of options.

8. The data storage device of claim 1, wherein the one or more processors, individually or in combination, are further configured to:

use block health metrics in determining the first and second numbers.

9. The data storage device of claim 1, wherein the requested total amount of data is directly expressed in the request from the host.

10. The data storage device of claim 1, wherein the requested total amount of data is indirectly expressed in the request from the host.

11. The data storage device of claim 10, wherein the requested total amount of data is indirectly expressed using a configuration scale.

12. The data storage device of claim 1, wherein the memory comprises a three-dimensional memory.

13. A method comprising:

performing in a data storage device comprising a memory comprising a plurality of memory areas, each memory area being configurable as a single-level cell (SLC) memory area or as a multi-level cell (MLC) memory area:

receiving, from a host, an indication of an amount of data to be stored in the memory over a plurality of write cycles;

determining a ratio of SLC-to-MLC memory areas to attempt to store the indicated amount of data in the memory over the plurality of write cycles, wherein increasing the ratio of SLC-to-MLC memory areas increases a total amount of data that can be stored in the memory over the plurality of write cycles but decreases a total capacity of the memory, and wherein the total amount of data that can be stored in the memory over the plurality of write cycles is different from a number of write cycles that each of the plurality of memory areas can endure; and configuring the memory according to the determined ratio of SLC-to-MLC memory areas.

14. The method of claim 13, wherein the ratio of SLC-to-MLC memory areas is determined using a data structure that associates a plurality of amounts of data with a plurality of capacities of the memory.

15. The method of claim 14, further comprising dynamically populating the data structure based on SLC memory area size, MLC memory area size, SLC memory area endurance, and MLC memory area endurance.

16. The method of claim 13, further comprising:

determining a memory capacity resulting from the determined ratio of SLC-to-MLC memory areas; and informing the host of the determined memory capacity.

17. The method of claim 16, wherein the memory is configured according to the determined ratio of SLC-to-MLC memory areas in response to receiving approval from the host of the determined memory capacity.

18. The method of claim 16, further comprising:

receiving a file system update request from the host; and in response to receiving a file system update request from the host, designating the data storage device as having the determining memory capacity.

19. The method of claim 13, wherein the indication is expressed using a configuration scale.

20. A data storage device comprising:

a memory comprising a plurality of blocks, wherein each block is configurable as a single-level cell (SLC) block or as a multi-level cell (MLC) block, wherein a total amount of data that can be written in the memory is based on a capacity of each of the plurality of blocks and a number of program/erase cycles that each of the plurality of blocks can endure, and wherein an MLC block comprises a higher capacity but can endure fewer program/erase cycles as compared to an SLC block; and means for dynamically negotiating, with a host, a configuration of the memory that trades-off the total amount of data that can be written in the memory with a total capacity of the memory, wherein increasing a number of blocks that are configured as SLC blocks increases the total amount of data that can be written in the memory but decreases the total capacity of the memory, wherein the total amount of data that can be written in the memory is different from the number of program/erase cycles that each of the plurality of blocks can endure.

* * * * *